United States Patent [19]

Lewis

[11] Patent Number: 5,563,736
[45] Date of Patent: Oct. 8, 1996

[54] COMPACT REAL IMAGE FINDER

[75] Inventor: Alan E. Lewis, Rochester, N.Y.

[73] Assignee: Eastman Kodak Company, Rochester, N.Y.

[21] Appl. No.: 263,845

[22] Filed: Jun. 22, 1994

[51] Int. Cl.⁶ .................................................. G02B 23/00
[52] U.S. Cl. ........................ 359/432; 359/362; 359/421; 359/422
[58] Field of Search .................................. 359/362–363, 359/422–423, 431, 432, 656, 670–679, 708; 354/152, 155, 199, 219–225

[56] References Cited

U.S. PATENT DOCUMENTS

| | | | |
|---|---|---|---|
| 4,779,969 | 10/1988 | Sato et al. | 359/422 |
| 4,867,549 | 9/1989 | Sekine | 339/431 |
| 5,130,845 | 7/1992 | Ruben | 359/428 |
| 5,132,838 | 7/1992 | Ohshita | 359/422 |
| 5,245,375 | 9/1993 | Ohshita | 354/219 |
| 5,247,324 | 9/1993 | Estelle | 354/222 |

Primary Examiner—Thong Nguyen
Attorney, Agent, or Firm—Leonard W. Treash, Jr.

[57] ABSTRACT

A compact, simple real image finder includes an objective, a field lens, erecting optics and an eyepiece. The field lens is separated from an internal image sufficiently that it contributes substantially to the magnification of the finder.

5 Claims, 1 Drawing Sheet

COMPACT REAL IMAGE FINDER

This invention relates to real image, fixed magnification, finders usable on cameras.

Modern cameras having finders which do not use any of the taking lens optics are generally either of a reverse Galilean type or of a real image type. The reverse Galilean is somewhat less expensive and more compact. However, the real image type provides much better framing of the subject. More compactness and less expense in real image finders is desirable.

U.S. Pat. No. 5,245,375, granted to Ohshita on Sep. 14, 1993, shows a simple real image finder which includes a single element objective which images a subject at an inverted image plane at which is located a single element field lens. A porro prism or other erecting optics is used to erect the image for viewing through a single element eyepiece.

Designs of real image finders may be considerably more complicated; see for example, U.S. Pat. No. 4,867,649, granted to Sekina on Sep. 19, 1989. U.S. Pat. Nos. 5,130,845, granted to Ruben on Jul. 14, 1992 and 5,247,324, granted to Estelle on Sep. 21, 1993, show zoom real image finders. Both of these latter finders show some power added to the rear surface of the erecting prism to assist the eyepiece.

SUMMARY OF THE INVENTION

It is an object of the invention to provide a real image, fixed magnification, finder for use in a camera, which finder is compact and simple.

This and other objects are accomplished by a real image finder having an objective and a field lens that form an inverted real image of an object or subject at a real image position. The real image is again inverted and relayed to an observer's eye using conventional inverting optics such as an inverting prism, and an eyepiece. The field lens is positioned and is chosen with sufficient power to contribute substantially to the magnification of the system, thereby reducing the finder's overall length.

According to a preferred embodiment, the field lens affects the overall magnification of the finder by at least 15 percent.

According to a further preferred embodiment, the following inequalities are maintained:

$$0.3 < \frac{EF(I+II)}{EF(III+IV)} < 0.35 \text{ and}$$

$$0.4 < \frac{EF(I)}{EF(III+IV)} < 0.5$$

where EF is the focal length of the combination of components in the parenthesis, which components are numbered from front to rear (I to IV).

DETAILED DESCRIPTION OF THE INVENTION

Figure 1:
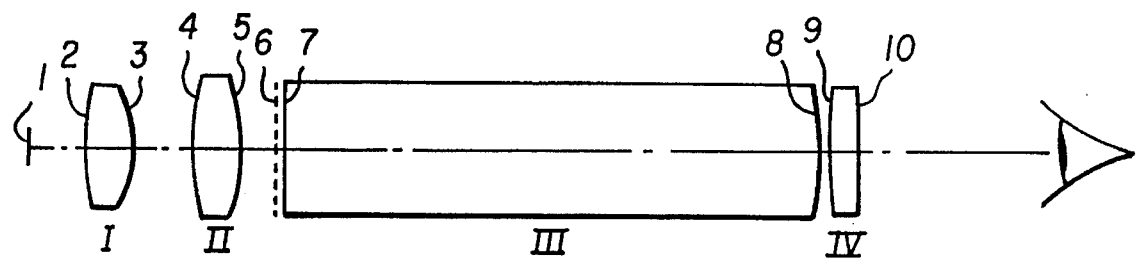
FIGS. 1 and 2 are side schematics of alternative real image finders.
Figure 2:
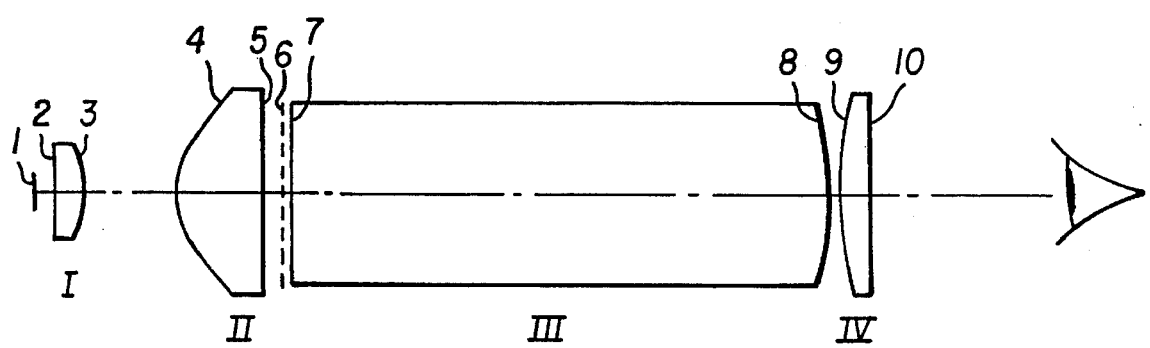

In the following examples all distances are in millimeters, the surfaces are numbered from front to rear, from object or subject to the eye or image side of the finder. The indexes are for the sodium D line of the spectrum and V is the abbe number.

EXAMPLE 1

(FIG. 1)

| SURF. | CLEAR APERTURE DIAGONAL | RADIUS | THICKNESS | INDEX | V |
|---|---|---|---|---|---|
| 1 | 2.320 | BAFFLE | 3.206 | | |
| 2 | 6.596 | 11.9311 | 2.998 | 1.492 | 57.4 |
| 3 | 7.314 | ASPHERE | 3.478 | | |
| 4 | 8.358 | ASPHERE | 2.914 | 1.492 | 57.4 |
| 5 | 8.466 | −11.9598 | 1.869 | | |
| 6 | | (MASK) | .318 | | |
| 7 | 7.672 | PLANO | 31.900 | 1.590 | 30.9 |
| 8 | 7.920 | −21.6700 | .500 | | |
| 9 | 7.694 | ASPHERE | 1.767 | 1.492 | 57.4 |
| 10 | 7.382 | −71.9015 | | | |

FINDER LENGTH (SURFACES 1–10) = 48.950
(SURFACES 2–10) = 45.744

ASPHERIC EQUATION:

$$X = \frac{CY^2}{1 + \sqrt{1 - (k+1)C^2Y^2}} + DY^4 + EY^6 + FY^8 + GY^{10}$$

| | SURFACE 3: | SURFACE 4: | SURFACE 9: |
|---|---|---|---|
| C | −.14591783 | .09657299 | .02735793 |
| k | −.890015 | 2.466914 | 0 |
| D | −.182554E-03 | −.124755E-02 | −.222186E-04 |
| E | .141572E-04 | −.175500E-04 | .402699E-05 |
| F | .152604E-05 | −.159344E-06 | −.143898E-06 |
| G | −.688382E-07 | .608864E-08 | −.845662E-10 |
| VERTEX RADIUS (1/C) = | −6.853172 | 10.354862 | 36.552478 |

Surface 6 is a mask located at the inverted image position. This finder is designed for interchangeable masks, including a panoramic mask and two conventional format masks of different aspect ratios. A small amount of barrel distortion slightly rounds the corners of the image.

Focal lengths (EF) for the components (I to IV) and some combinations are:

EF(I)=9.306 (OBJECTIVE)
EF(II)=11.747 (FIELD LENS)
EF(I+II)=6.895 (OBJECTIVE+FIELD LENS)
EF(III)=36.423 (PRISM)
EF(IV)=49.343 (EYELENS)
EF(III+IV)=21.177 (PRISM+EYELENS)

Viewfinder aberrations over the largest format field are:

| FIELD | ACCOMMODATION (DIOPTERS) | ASTIGMATISM (DIOPTERS) | DISTORTION (%) | LATERAL COLOR (MINUTES OF ARC) |
|---|---|---|---|---|
| AXIS | −1.25 | 0 | 0 | 0 |
| TOP | −.93 | −.44 | −.98 | 1.95 |
| SIDE | −.39 | −1.19 | −1.59 | 1.80 |
| CORNERS | −.09 | −1.55 | −1.79 | 1.66 |

Viewfinder convergence is −1.25 diopter. A focusing aid can be etched on surface 7, preferably within 30 percent of the largest format semi-diagonal.

This finder is only 48.95 mm in length while providing an apparent one-half field of 10.66°. A strong field lens, element II, is separated from the image position at the mask (surface 6). This power and separation cause the field lens to contribute meaningfully to the magnification of the finder and, therefore, to its compactness. The focal length of objective and field lens as a group divided by the focal length of the eyepiece and the prism (effectively part of the eyepiece) is equal to:

$$\frac{6.895}{21.177} = .33$$

which is the magnification. If the effect of the field lens were eliminated, for example, by positioning all of its power at the inverted image, the magnification would be 0.44. Preferably, the field lens is separated from the image by a distance and is powerful enough with the separation to affect the overall magnification of the finder by at least 15 percent and, preferably, by more than 20 percent. For the specific magnification range of the Example 1 finder, maintenance of the following inequalities is preferred:

$$0.3 < \frac{EF(I+II)}{EF(III+IV)} < 0.35 \text{ and}$$

$$0.4 < \frac{EF(I)}{EF(III+IV)} < 0.5$$

All elements are plastic, facilitating substantial use of aspheres and providing a well corrected, inexpensive compact finder particularly adapted for use with changeable masks.

| SURF. | RADIUS | THICKNESS | N | V |
|---|---|---|---|---|
| 1 | BAFFLE | 1.300 | | |
| 2 | −31.2098 | 1.817 | 1.492 | 57.4 |
| 3 | ASPHERE | 5.383 | | |
| 4 | ASPHERE | 5.424 | 1.492 | 57.4 |
| 5 | PLANO | 1.250 | | |
| 6 | (MASK) | .318 | | |
| 7 | PLANO | 31.900 | 1.590 | 30.9 |
| 8 | −21.6700 | .500 | | |
| 9 | ASPHERE | 1.767 | 1.492 | 57.4 |
| 10 | PLANO | | | |

FINDER LENGTH (SURFACES 1–10) = 49.659
(SURFACES 2–10) = 48.359

ASPHERIC EQUATION:

$$X = \frac{CY^2}{1 + \sqrt{1 - (K+1)C^2Y^2}} + DY^4 + EY^6 + FY^8 + GY^{10} + HY^{12} + IY^{14} + JY^{16} + KY^{18}$$

| | SURFACE 3: | SURFACE 4: | SURFACE 9: |
|---|---|---|---|
| C | −.15029162 | .22085150 | .04275761 |
| k | −132.317804 | −1.405620 | 0 |
| D | −.406818E-01 | −.555272E-04 | .335440E-03 |
| E | .362635E-01 | −.103686E-06 | −.177954E-03 |
| F | −.240947E-01 | 0 | .387553E-04 |
| G | .981884E-02 | 0 | −.463037E-05 |
| H | −.234392E-02 | 0 | .316392E-06 |

| | | | |
|---|---|---|---|
| I | .318628E-03 | 0 | −.120532E-07 |
| J | −.227136E-04 | 0 | .236207E-09 |
| K | .656506E-06 | 0 | −.185011E-11 |
| VERTEX RADIUS (1/C) = | −6.6537309 | 4.5279295 | 23.38765 |

Example 2 is designed for the same formats as Example 1. A small amount of pincushion distortion causes a slight loss of image or framing error in the corners.

Component focal lengths (EF) for the components (I to IV) and some combinations are:

EF(I)=16.718 (OBJECTIVE)

EF(II)=9.1700 (FIELD LENS)

EF(I+II)=7.3611 (OBJECTIVE+FIELD LENS)

EF(III)=36.423 (PRISM)

EF(IV)=47.365 (EYELENS)

EF(III+IV)=20.713 (PRISM+EYELENS)

Viewfinder convergence is −1.0 diopter. Like Example 1, all elements are plastic, facilitating the use of aspheres which provide the high degree of correction obtained. Also, like Example 1, a focusing aid can be etched onto surface 7, preferably within 30 percent of the largest format semi-diagonal. The baffle (surface 1) is round with a diameter of 1.95. Surfaces 2 and 3 have diagonal apertures of 3.16 and 4.20, respectively. This example is less well corrected than Example 1.

This finder is only 49.659 mm in length while providing an apparent one-half field of 11.27°. Although the second surface of the field lens, surface 5, is only 1.250 mm from the inverted image, it is a plane surface. The power in the field lens (component II) is in surface 4 which is an asphere having an axial separation of 6.674 mm from the image. The magnification is equal to the focal length of components I and II divided by the focal length of components III and IV, which equals 0.36. Without the field lens, the magnification would be 0.80.

The invention has been described in detail with particular reference to a preferred embodiment thereof, but it will be understood that variations and modifications can be effected within the spirit and scope of the invention as described hereinabove and as defined in the appended claims.

I claim:

1. A real image finder having a fixed magnification for use with a camera, said finder including an objective and a field lens positioned to form a real inverted image of a subject or object at a real image position, erecting optics and eyepiece optics for erecting the image and relaying it to the eye of an observer, wherein the magnification of the finder is more than 24 percent greater than it would be without the field lens.

2. A finder according to claim 1 in which the following inequalities are maintained:

$$0.3 < \frac{EF(I+II)}{EF(III+IV)} < 0.35 \text{ and}$$

$$0.4 < \frac{EF(I)}{EF(III+IV)} < 0.5$$

wherein EF(I), EF(I+II) and EF(III+IV) are effective focal lengths of the objective, the combination of the objective and the field lens, and the combination of the inverting optics and the eyepiece, respectively.

3. A finder according to claim 2 wherein the objective and the field lens are stationary single element biconvex components.

4. A finder constructed according to the following tables wherein distances are in millimeters, the surfaces are numbered from an object side to a viewing side of the finder, the index is the index of refraction for the sodium D line of the spectrum and V is the abbe number of the materials used:

| SURF. | CLEAR APERTURE DIAGONAL | RADIUS | THICKNESS | INDEX | V |
|---|---|---|---|---|---|
| 1 | 2.320 | BAFFLE | 3.206 | | |
| 2 | 6.596 | 11.9311 | 2.998 | 1.492 | 57.4 |
| 3 | 7.314 | ASPHERE | 3.478 | | |
| 4 | 8.358 | ASPHERE | 2.914 | 1.492 | 57.4 |
| 5 | 8.466 | −11.9598 | 1.869 | | |
| 6 | | (MASK) | .318 | | |
| 7 | 7.672 | PLANO | 31.900 | 1.590 | 30.9 |
| 8 | 7.920 | −21.6700 | .500 | | |
| 9 | 7.694 | ASPHERE | 1.767 | 1.492 | 57.4 |
| 10 | 7.382 | −71.9015 | | | |

FINDER LENGTH (SURFACES 1–10) = 48.950
(SURFACES 2–10) = 45.744

ASPHERIC EQUATION:

$$X = \frac{CY^2}{1 + \sqrt{1 - (k+1)C^2Y^2}} + DY^4 + EY^6 + FY^8 + GY^{10}$$

| | SURFACE 3: | SURFACE 4: | SURFACE 9: |
|---|---|---|---|
| C | −.14591783 | .09657299 | .02735793 |
| k | −.890015 | 2.466914 | 0 |
| D | −.182554E-03 | −.124755E-02 | −.222186E-04 |

-continued

|   |   |   |   |
|---|---|---|---|
| E | .141572E-04 | −.175500E-04 | .402699E-05 |
| F | .152604E-05 | −.159344E-06 | −.143898E-06 |
| G | −.688382E-07 | .608864E-08 | −.845662E-10 |
| VERTEX RADIUS (1/C) = | −6.853172 | 10.354862 | 36.552478. |

5. A finder constructed according to the following tables wherein distances are in millimeters, the surfaces are numbered from an object side to a viewing side of the finder, the index is the index of refraction for the sodium D line of the spectrum and V is the abbe number of the materials used:

| SURF. | RADIUS | THICKNESS | N | V |
|---|---|---|---|---|
| 1 | BAFFLE | 1.300 | | |
| 2 | −31.2098 | 1.817 | 1.492 | 57.4 |
| 3 | ASPHERE | 5.383 | | |
| 4 | ASPHERE | 5.424 | 1.492 | 57.4 |
| 5 | PLANO | 1.250 | | |
| 6 | (MASK) | .318 | | |
| 7 | PLANO | 31.900 | 1.590 | 30.9 |
| 8 | −21.6700 | .500 | | |
| 9 | ASPHERE | 1.767 | 1.492 | 57.4 |
| 10 | PLANO | | | |

FINDER LENGTH (SURFACES 1–10) = 49.659
(SURFACES 2–10) = 48.359

ASPHERIC EQUATION:

$$X = \frac{CY^2}{1 + \sqrt{1 - (K+1)C^2Y^2}} + DY^4 + EY^6 + FY^8 + GY^{10} + HY^{12} + IY^{14} + JY^{16} + KY^{18}$$

|   | SURFACE 3: | SURFACE 4: | SURFACE 9: |
|---|---|---|---|
| C | −.15029162 | .22095150 | .04275761 |
| k | −132.317804 | −1.405620 | 0 |
| D | −.406818E-01 | −.555272E-04 | .335440E-03 |
| E | .362635E-01 | −.103686E-06 | −.177954E-03 |
| F | −.240947E-01 | 0 | .387553E-04 |
| G | .981884E-02 | 0 | −.463037E-05 |
| H | −.234392E-02 | 0 | .316392E-06 |
| I | .318628E-03 | 0 | −.120532E-07 |
| J | −.227136E-04 | 0 | .236207E-09 |
| K | .656506E-06 | 0 | −.185011E-11 |
| VERTEX RADIUS (1/C) = | −6.6537309 | 4.5279295 | 23.38765. |

\* \* \* \* \*